United States Patent
McHugh et al.

(10) Patent No.: US 9,667,569 B1
(45) Date of Patent: May 30, 2017

(54) SYSTEM AND METHOD FOR ADAPTIVE SERVER SHIELDING

(75) Inventors: Jason G. McHugh, Seattle, WA (US); Sohel R. Ahuja, Bellevue, WA (US); James Christopher Sorenson, III, Seattle, WA (US); Allan H. Vermeulen, Seattle, WA (US); John David Cormie, Seattle, WA (US)

(73) Assignee: Amazon Technologies, Inc., Reno, NV (US)

( * ) Notice: Subject to any disclaimer, the term of this patent is extended or adjusted under 35 U.S.C. 154(b) by 2065 days.

(21) Appl. No.: 12/770,552

(22) Filed: Apr. 29, 2010

(51) Int. Cl.
| G06F 15/16 | (2006.01) |
| H04L 12/931 | (2013.01) |
| H04L 29/08 | (2006.01) |
| H04L 12/801 | (2013.01) |
| H04L 12/803 | (2013.01) |

(52) U.S. Cl.
CPC ............ *H04L 49/503* (2013.01); *H04L 47/11* (2013.01); *H04L 47/125* (2013.01); *H04L 67/1004* (2013.01); *H04L 67/1008* (2013.01)

(58) Field of Classification Search
None
See application file for complete search history.

(56) References Cited

U.S. PATENT DOCUMENTS

| 5,539,883 A | 7/1996 | Allon et al. |
| 5,905,868 A | 5/1999 | Baghai et al. |
| 5,915,095 A | 6/1999 | Miskowiec |
| 6,119,143 A * | 9/2000 | Dias et al. ................ 709/201 |
| 6,128,279 A | 10/2000 | O'neil et al. |
| 6,128,644 A | 10/2000 | Nozaki |
| 6,178,160 B1 | 1/2001 | Bolton et al. |
| 6,324,580 B1 | 11/2001 | Jindal et al. |
| 6,327,622 B1 | 12/2001 | Jindal et al. |
| 6,351,775 B1 * | 2/2002 | Yu .............................. 709/238 |
| 6,671,259 B1 | 12/2003 | He et al. |
| 7,613,822 B2 | 11/2009 | Joy et al. |

(Continued)

OTHER PUBLICATIONS

"Flash Crowds and Denial of Service Attacks: Characterization and Implications for CDNs and Web Sites," Jaeyeon Jung, Balachander Krishnamurthy and Michael Rabinovich, May 7-11, 2002, ACM 1-58113-449-5/02/0005.

(Continued)

*Primary Examiner* — Scott B Christensen
(74) *Attorney, Agent, or Firm* — Robert C. Kowert; Meyertons, Hood, Kivlin, Kowert & Goetzel, P.C.

(57) ABSTRACT

A distributed system comprises one or more computers implementing a downstream server configured to determine whether it is overloaded and in response, to indicate to one or more upstream servers that the downstream server is in a hotspot situation. The system comprises one or more computers implementing one or more upstream servers configured to respond to receiving the indication of the hotspot situation by shielding the downstream server from subsequent requests, the shielding including serving one or more client requests without requesting service from the downstream server and reporting one or more measures of the shielded requests to the downstream server. The downstream server is further configured to determine whether the hotspot situation still exists, dependent on one or more of the reported measures.

36 Claims, 6 Drawing Sheets

(56) References Cited

U.S. PATENT DOCUMENTS

| | | | |
|---|---|---|---|
| 7,636,917 | B2 | 12/2009 | Darling et al. |
| 2001/0052016 | A1 | 12/2001 | Skene et al. |
| 2003/0023767 | A1 | 1/2003 | Brabson et al. |
| 2003/0105797 | A1 | 6/2003 | Dolev et al. |
| 2004/0010588 | A1 | 1/2004 | Slater et al. |
| 2005/0055435 | A1 | 3/2005 | Gbadegesin et al. |
| 2007/0283419 | A1* | 12/2007 | Afergan et al. .................. 726/3 |
| 2008/0301333 | A1 | 12/2008 | Butler et al. |
| 2009/0210431 | A1* | 8/2009 | Marinkovic et al. ........... 707/10 |
| 2010/0036903 | A1 | 2/2010 | Ahmad et al. |
| 2010/0274893 | A1* | 10/2010 | Abdelal et al. ............... 709/224 |

OTHER PUBLICATIONS

"Experimental Evaluation of an Adaptive Flash Crowd Protection System," Chen and Heidemann, Jul. 2003, 12 pages.

"Flash Crowd Mitigation via Adaptive Admission Control based on Application-level Observations," Chen and Heidemann, ACM Transactions on Internet Technology, vol. 5, No. 3, Aug. 2005, pp. 532-569.

"Implementing Pushback: Router-Based Defense Against DDoS Attacks," Ioannidis and Bellovin, 2002.

"Controlling High Bandwidth Aggregates in the Network," Ratul Mahajan, et al., 2002.

"Staying FIT: Efficient Load Shedding Techniques for Distributed Stream Processing," Tatbul, et al., VLDB '07, Sep. 23-28, 2007, Vienna, Austria. Copyright 2007 VLDB Endowment, ACM 978-1-59593-649-3/07/09.

U.S. Appl. No. 13/167,557, filed Jun. 23, 2011, James Christopher Sorenson et al.

* cited by examiner

SYSTEM AND METHOD FOR ADAPTIVE SERVER SHIELDING

BACKGROUND

Distributed computing systems are often implemented as multiple hardware and/or software servers configured to communicate with one another via message passing, such as over a network. Often, the servers of the distributed applications are logically organized into functional groups called "layers" or "tiers." For example, a typical distributed application may include a group of servers in a "web tier" that are configured to receive incoming client requests from over a network (e.g., Internet, LAN, other WAN, etc.). The distributed application may also include another group of servers, such as a group comprising a database tier, each configured to service requests for data from the web tier servers. Thus, the web tier servers may be considered clients of the data base servers. In different architectures, servers in upper tiers may request and receive service from servers in lower tiers according to the distributed architecture.

During execution on a distributed system, a situation may arise in which a given server experiences an excessive workload. For example, if the servers in the web tier disproportionately query one of the database tier server, then that one database tier server may become overloaded and cause a performance bottleneck. This overloaded server may be referred as being in a "hotspot" situation.

Various techniques have been developed to redress such load-imbalance situations and mitigate hotspots in distributed systems. For example, adaptive workload scheduling techniques often include a scheduling mechanism to evenly distribute load on the servers in a given tier. However, in some situations, it may not be possible or desirable to adaptively redistribute load across a given tier. In such cases, other hotspot mitigation techniques may be desirable.

While the disclosure is described herein by way of example for several embodiments and illustrative drawings, those skilled in the art will recognize that the disclosure is not limited to the embodiments or drawings described. It should be understood that the drawings and detailed description hereto are not intended to limit the disclosure to the particular form disclosed, but on the contrary, the intention is to cover all modifications, equivalents and alternatives falling within the spirit and scope of the present disclosure as defined by the appended claims. Any headings used herein are for organizational purposes only and are not meant to limit the scope of the description or the claims. As used herein, the word "may" is used in a permissive sense (i.e., meaning having the potential to) rather than the mandatory sense (i.e. meaning must). Similarly, the words "include," "including," and "includes" mean including, but not limited to.

DETAILED DESCRIPTION OF EMBODIMENTS

Figure 1:
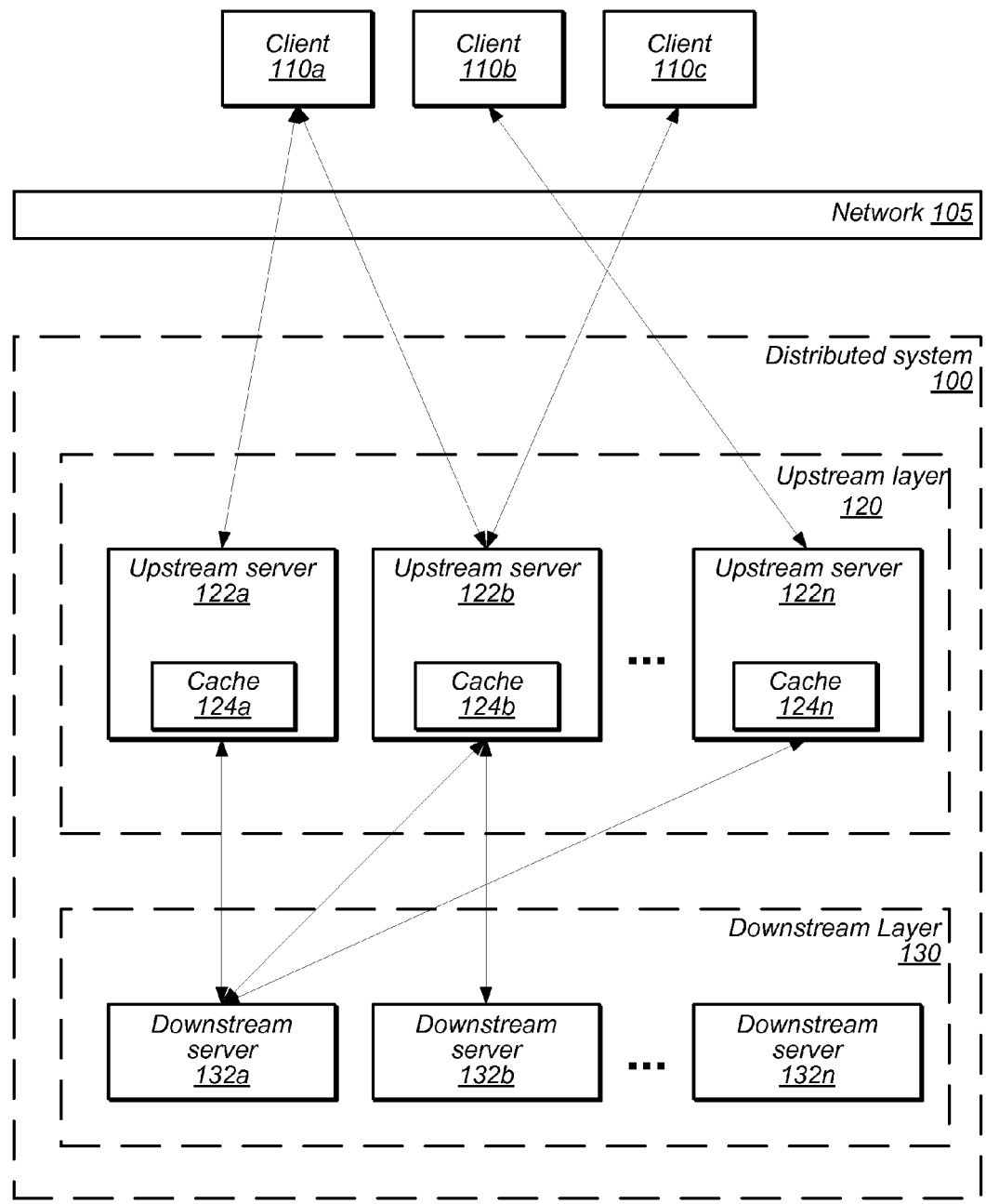
FIG. 1 is a block diagram illustrating an example of a simple distributed system configured to implement hotspot mitigation using workload level feedback, according to various embodiments.

FIG. 1 is a block diagram illustrating an example of a simple distributed system configured to implement hotspot mitigation using workload level feedback, according to various embodiments. For example, in some embodiments, distributed system 100 may implement a multi-tier web application or a distributed storage service. In various embodiments, distributed application 100 may include various other services and/or layers not depicted in FIG. 1.

According to the illustrated embodiment, distributed system 100 may include an upstream layer 120 configured to service requests from various clients 110 over a network 105. In various embodiments, clients 110 may include web browsers, stand-alone applications, various other thin or rich clients, components of other distributed systems, and/or any other types of clients capable of communicating with distributed system 100 over network 105. In various embodiments, network 105 may include one or more wide area networks (WAN) such as the Internet, local-area networks, and/or other communications network that facilitate communication between clients 110 and distributed system 100 according to various protocols.

As illustrated in FIG. 1, each client 110 may communicate service requests to the distributed system 100, as illustrated by the example arrows connecting clients 110 with various servers in upstream layer 120. For example, upstream layer 120 may implement a web tier configured to accept requests from web clients (e.g., browsers) over an IP network 105.

According to the illustrated embodiment, upstream layer 120 may include any number of upstream servers 122. In some embodiments, each upstream server 122 may implement a respective instance of a web server software application. In other embodiments, an upstream server 122 may be at various other levels of a distributed system hierarchy. The term upstream server is used in this disclosure to indicate the server's position in a service workflow with respect to one or more downstream servers, such as 132. That is, an upstream server may invoke one or more services of a downstream server as part of servicing a client request. It is noted that in various embodiments, upstream servers 122 and downstream servers 132 may implement any suitable type of application or functionality. For example, in a distributed database system, upstream servers 122 may be configured to receive queries from clients and direct queries to downstream servers 132, which may be configured to parse and execute queries with respect to stored records. In another embodiment, upstream servers 122 may be configured to implement a business logic tier of a multi-tier system, and downstream servers 132 may be configured to implement a data storage tier of a multi-tier system.

In various embodiments, ones of upstream servers 122 may be implemented on the same or on different physical hardware and/or logical hardware (virtual machines). For simplicity of this disclosure, it is assumed that every server is implemented on a respective physical hardware resource. However, those skilled in the art will recognize that various other hardware/software mappings are possible.

In some embodiments, clients 110 may communicate directly with various ones of upstream servers 122. In other embodiments, communication between clients 110 and upstream servers 122 may be controlled via a proxy server, a load balancer, and/or via another type of intermediary.

According to the illustrated embodiment, distributed system 100 further comprises a downstream layer 130 that includes a plurality of downstream servers 132. Downstream servers 132 may be configured to service requests from upstream servers 122. In different embodiments, downstream servers 132 may provide various services to upstream servers 122, such as database connectivity, business logic, storage services, etc. For example, as mentioned above, clients 110 may correspond to web browsers, upstream servers 122 may correspond to web servers, and downstream servers 132 may correspond to business logic servers. In additional embodiments, any number of additional layers, such as a database layer or arbitrary web services, may be included.

In distributed systems, it is often the case that an upstream server may accept a request from a client and in the process of servicing that request, may need to request services from a server in a downstream layer. FIG. 1 illustrates an example of this workflow. In the illustrated embodiment, example requests from clients 110 are routed through distributed system 100: client 110*a* sends respective requests to upstream server 122*a* and 122*b*, client 110*b* sends a request to upstream server 122*n*, and client 110*c* sends a request to upstream server 122*b*. For example, each client 110 may correspond to a storage service client, distributed system 100 to a storage service with a web-tier of web servers 122, and various requests from clients 110 may include storage system access requests such as reads or writes to files hosted by the distributed storage service 100.

As part of servicing each request, each upstream server 122 sends a request to a downstream server 132 in downstream layer 130. For example, various requests from upstream servers 122 may be for service data stored on or generated by a given downstream server, which may be arbitrarily trivial or complex (e.g., an image file, file metadata, etc.). In the illustrated example, each upstream server sends a request to downstream server 132*a*, while only one request is routed to downstream server 132*b*. Hence, there is a load imbalance in downstream layer 130 with downstream server 132*a* being a potential hotspot.

While it may sometimes be possible for scheduling techniques to ensure that a workload is distributed among servers in a layer relatively evenly, this may not always be possible and/or desirable. For example, if only particular ones of the downstream servers are capable of servicing a given request, then the characteristics of the workload may dictate hotspot behavior. For example, if only one of the downstream servers stores a given portion of service data authoritatively, then excessive requests for that service data may disproportionately burden the one downstream server storing it. A server is said to authoritatively store data if it holds the only available copy of that data or the version stored on that server takes precedence over a version stored elsewhere (e.g., the most up-to-date version of the data or another controlling or master copy).

Consider an example where distributed system 100 implements a storage service. Various examples of such a storage service are described in U.S. patent application Ser. No. 11/371,304, entitled "DISTRIBUTED STORAGE SYSTEM WITH WEB SERVICES CLIENT INTERFACE" and filed Mar. 8, 2006, which is hereby incorporated by reference in its entirety. In such an example, upstream layer 120 may implement a web tier of web servers that receive incoming storage operation requests from clients, such as through a web services interface. Downstream layer 130 may implement a key-mapping service usable to retrieve the locations of various replicas of a data object within the storage service, given a user key identifying the data object as an input. In such a system, it may be the case that a particular key corresponding to a particular object can only be served by a single respective downstream server. Therefore, if a workload consists disproportionately of requests involving that particular key, a hotspot may develop (e.g., in downstream server 132*a*).

As used herein, a server may be said to be in a hotspot situation if the workload volume destined for it is greater than the server can service without becoming overloaded. A server may be considered overloaded if it receives a higher volume of client requests than it can, or prefers to, handle. For example, if servers in a web tier receive a high volume of client requests that requires service data from a particular downstream server, and that downstream server cannot, or for whatever reason prefers not to, handle that volume of requests, then the downstream server is said to be in a hotspot situation (regardless of whether or not the downstream server actually receives the workload and becomes overloaded). A hotspot situation may exist or persist if the workload that would ordinarily be sent to a downstream server would cause that downstream server to become overloaded, even if some or all of that workload is not actually sent to the downstream server.

An overloaded server may be considered to be a special case of a server in a hotspot situation. A server may be said to be overloaded only if it actually receives and/or actually processes an excessive workload. For example, in different circumstances, an excessive workload may be one whose volume is in excess of some pre-defined threshold (e.g., 1000 requests per second), one that the receiving server is unable to service according to various service-level requirements (e.g., 0.5 seconds turnaround per request) due to the workload's high volume, one whose processing would cause the server to consume various computing resources (e.g., CPU, memory, network bandwidth, database connections) beyond some thresholds due to the workload volume, and/or any other workload whose processing would cause the server to experience performance degradation and/or failure due to an excessive workload volume.

In various embodiments, a downstream server may detect whether it is in a hotspot situation, in some cases, by detecting that the server is overloaded. For example, in some embodiments, a server may detect that it is overloaded by measuring one or more performance metrics of the server and determining that any or all of the performance metrics fail to meet particular requirements (e.g., average turn-around time for requests over a given period is greater than a maximum threshold). Another way to detect that the server is overloaded may include determining that a given measure of the workload (e.g., requests per second) has surpassed a predetermined maximum or minimum threshold. In yet another example, a server may determine that it is overloaded in response to detecting that consumption of various compute resources of the server has surpassed given thresholds. For example, if memory, CPU, and/or network bandwidth usage surpasses a maximum threshold, a server may determine that it is overloaded.

As discussed below, in various embodiments, a server may detect that it is in a hotspot situation even if the server is not overloaded. Such determinations may be informed at least in part by feedback (e.g., shielding reports) from upstream servers configured to shield the downstream server, as discussed below.

In response to detecting that it is in a hotspot situation (e.g., that the server is overloaded), the server may send an indication of the hotspot situation to one or more of the upstream servers. For example, after detecting a hotspot situation, a downstream server may respond to a service request from an upstream server with a message indicating that a hotspot situation exists on the downstream server. In various embodiments, such an indication may be attached to the regular service response, may be sent separately, or may be sent instead of the expected service response. Additionally, in some embodiments, the indication may include a measure of the hotspot situation (e.g., degree of overload) and/or a measure of the potential benefit to the downstream server of shielding the downstream server from certain types of requests. In some embodiments, the indication may describe the types of requests as a set of one or more request parameters and/or as a template indicating the form of requests to shield.

If an upstream server has been notified that a given downstream server is experiencing a hotspot situation, the upstream server may shield the downstream server from some or all subsequent requests. For example, in some embodiments, the upstream server may redirect its request to an alternate downstream server, choose to use a locally cached copy (e.g., in caches 124) of some service data rather than querying the downstream server, intentionally ignore the client request, perform the downstream service itself (e.g., re-calculating or approximating a result already stored on the downstream server), and/or otherwise service the client request without making a service request to the hotspot downstream server. Thus, the upstream server shields the downstream server from having to service an additional request and the workload of the downstream server is reduced.

In various embodiments, an upstream server may implement different shielding policies. The specific policy chosen may be dependent on such factors as the server implementation, the types of services required from the downstream server, the type of data needed from the downstream server, the degree of the hotspot situation, the service quality required for the client, etc. For example, in one embodiment, if the downstream server reports a mild hotspot situation (e.g., the server is only slightly overloaded), the upstream server may decide to shield only a portion of the requests bound for the downstream server, according to the upstream server's shielding policy (e.g., send only high-priority and/or high quality of service requests and shield others). In another example, the policy may indicate that only some sub-portion of client requests that do not necessarily require fresh service data from the downstream server may be shielded (e.g., by serving the client requests with data from a local cache). In various embodiments, different servers in an upstream layer may implement different shielding policies and/or mechanisms, which may be independent of those implemented by other servers in the layer.

In various embodiments, an upstream server shielding a downstream server using a cache (e.g., 124) may occasionally refresh the data in the cache by sending a request to the downstream server for the refreshed data. In some embodiments, the rate at which the upstream server issues refresh requests to a given downstream server may depend on various mechanisms, such as a time-to-live (TTL) metric that denotes a maximum period of time for which the server may use given cached data before the data is considered "stale" and should no longer be used. A server that implements higher TTL limits, for example, may shield the downstream server from more requests than it would were it to use a lower TTL. However, a server using the higher TTL may occasionally serve staler data than one with a lower TTL. In various embodiments, the TTL interval may be measured in physical time (e.g., seconds) or in logical time (e.g., service events, etc.).

In some embodiments, the upstream server may be configured to request a fresh version of data from the downstream server at a given time interval before the TTL for that data expires. For example, while the initial TTL for fresh data may be set to 2 s, the upstream server may be configured to request an update of the data when the TTL reaches 0.5 s. In such situations, the upstream server may make such requests even while the downstream server is in a hotspot situation.

When the downstream server determines that the hotspot situation no longer exists, it may indicate this to ones of the shielding upstream severs, which may respond by reducing or eliminating shielding behavior with regard to the downstream server. For example, in response to receiving an indication from a downstream server that a hotspot situation no longer exists at the downstream server, a shielding upstream server may resume invoking the downstream server for service relating to respective client requests.

In various embodiments, to determine whether it is still in a hotspot situation, a downstream server may estimate an aggregate workload level using measures of the observed workload that actually reaches and is serviced by the downstream server in conjunction with a shielded workload from which it has been shielded, as indicated by feedback from one or more shielding upstream servers. In some situations, even if the downstream server is no longer overloaded (e.g., due to shielding by upstream servers), it may still be in a hotspot situation. In such situations, if the downstream server requests that the upstream servers cease shielding, then the downstream server may quickly become overloaded again. Therefore, rather than relying only on the observed workload that actually reaches the downstream server to determine the total load on the downstream server, the downstream server may use feedback from shielding upstream servers to estimate an aggregate workload and thus determine if the downstream server is still in a hotspot situation.

According to some embodiments, an upstream server may maintain a record of requests from which it has shielded a downstream server. Such a record may be referred to herein as a shielding report. In various embodiments, the shielding report may include information indicative of various metrics, such as the number of requests from which the upstream server has shielded the downstream server, the length of time over which the shielded requests have occurred, the rate of requests shielded, the types of requests shielded, etc. In some embodiments, the shielding report may report various shielding statistics broken down by the types of requests that were shielded by the upstream server. For example, such request-types may correspond to those that the downstream server had previously identified to the upstream server as beneficial to shield.

A shielding upstream server may provide all or part of this shielding report to the shielded downstream server. In some embodiments, the upstream server may send this report to the downstream server as a separate message (e.g., at regular intervals), while in others the upstream server may attach all or part of the report to service invocations and/or to refresh requests that the upstream sever sends to the downstream server.

A downstream server may use received shielding records when determining whether an overload condition still exists. For example, in some embodiments, the downstream server may estimate a total current workload based at least on received shielding reports. In some embodiments, the downstream server may combine the shielding reports and observed workload to calculate a moving average of aggregate workload, as discussed in more detail below. The downstream server may then use this workload estimate to determine when the server is no longer in a hotspot situation.

In various embodiments, when the downstream server determines that the hotspot situation no longer exists, it may indicate this to one or more of the shielding upstream servers, which may respond by reducing and/or eliminating the shielding behavior altogether.

Figure 2A:
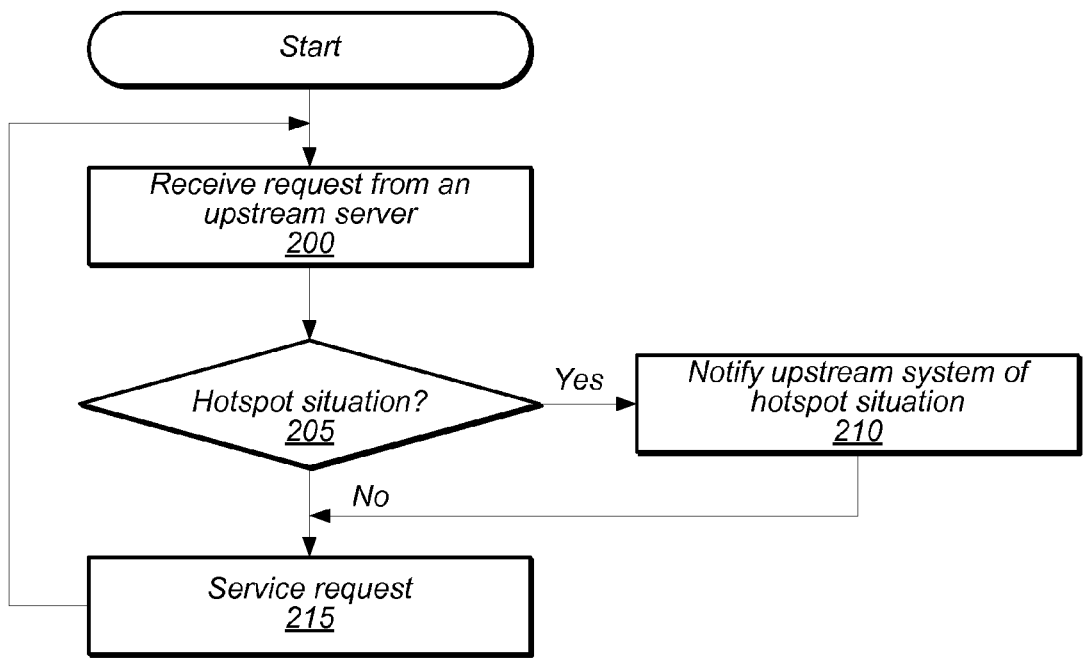
FIG. 2a is a flow diagram illustrating the operation of a downstream server participating in an adaptive shielding with feedback protocol, according to some embodiments.

FIG. 2a is a flow diagram illustrating the operation of a downstream server participating in an adaptive shielding with feedback protocol, according to some embodiments. The method of FIG. 2 may be performed by a downstream server, such as one of servers 132 in FIG. 1.

According to the illustrated embodiment, the downstream server receives a request from an upstream system, as in 200. For example, in a distributed storage service, this request may be for locator metadata given a user key. In other examples, this request may be for a database connection, business logic service, and/or any other service required by the upstream server to service a client request.

In response to receiving the request from the upstream system, as in 200, the downstream server may determine whether the downstream server is in a hotspot situation, as in 205. In various embodiments, determining if the downstream server is executing in a hotspot situation may comprise checking the value(s) of one or more performance metrics and/or workload estimates. For example, the downstream server may determine that it is in a hotspot situation in response to determining that the downstream server is overloaded (e.g., various performance and/or workload metrics such as request rate, turnaround time, throughput, system resource usage, etc. are at undesirable levels) or in response to estimating that the aggregate workload (i.e., observed plus shielded workloads) exceed some capacity, as in FIG. 2b.

If the server is not in a hotspot situation, as indicated by the negative exit from 205, the downstream server may service the request, as in 215, and await subsequent requests, as indicated by the feedback loop from 215 to 200. In some embodiments, servicing the request (as in 215) may include sending the upstream server an indication that no hotspot situation exists at the downstream server. In other embodiments, the downstream server may simply respond to the request and the upstream server may interpret the absence of a hotspot indication to imply that the downstream server is not in a hotspot situation.

Otherwise, if the server determines that it is in a hotspot situation, as indicated by the affirmative exit from 205, then the server may notify the upstream server of the hotspot situation (as in 210) and service the request (as in 215). In some embodiments, steps 210 and 215 may be combined such that the hotspot notification of 210 is sent along with service data in response to the request of 200.

In some embodiments, notification 210 may include a message indicating that the downstream server is in a hotspot situation and various hints for shielding the downstream server from future requests. In some embodiments, such a hint may describe types of requests to shield. For example, the downstream server may provide the upstream server with an invocation template, which may identify one or more functions and/or lists of parameters to those functions. Thus the downstream server may describe the types of service requests from which it wishes to be shielded. In some embodiments, the downstream server may supply the upstream server with a list or range of parameters corresponding to heavily requested service data. Such a hint may indicate to the upstream server that the downstream server would benefit if the upstream server shielded requests with these parameters.

In some situations, the notification of 210 may include one or more hints that negate previously sent hints. For example, suppose the downstream server had previously detected that a given portion of data was "hot" (i.e., there was a high volume of requests for the data) and consequently sent the upstream server a hint indicating that it should shield the downstream servers from requests for the hot data. If the volume of requests for the data subsequently abates (e.g., as indicated to the downstream server by shielding reports), then the downstream server may indicate to the upstream server in 210 that the upstream server need not continue to shield future requests for that data, even if the downstream server is still in a hotspot situation since the shielding may not significantly reduce the downstream server's workload.

In various embodiments, an upstream server may regard hints from the downstream server as only advisory, and may implement shielding behavior according to its own policies. In some embodiments, a downstream server may help guide the policy choices of the upstream server by providing additional hints, such as an estimated level of benefit that the downstream server estimates it would receive if the downstream server were shielded from the indicated types of requests.

Figure 2B:
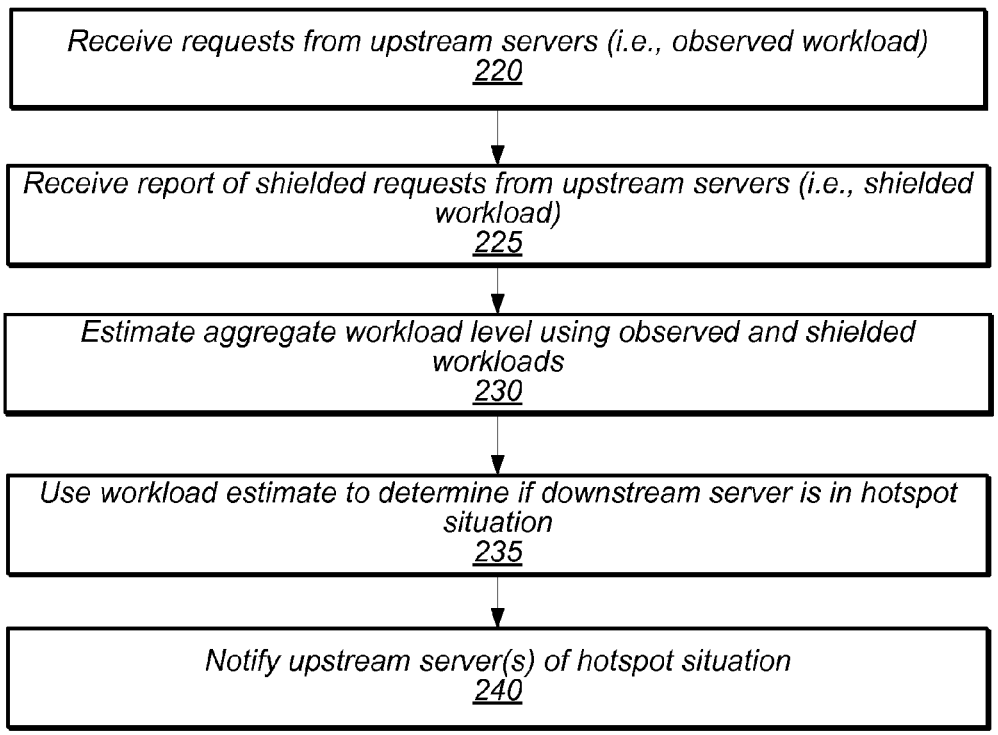
FIG. 2b is a flow diagram illustrating the operation of a downstream server determining whether it is in a hotspot situation and notifying an upstream server, according to some embodiments.

FIG. 2b is a flow diagram illustrating the operation of a downstream server determining whether it is in a hotspot situation and notifying an upstream server, according to some embodiments. In some embodiments, a downstream server may execute the method of FIG. 2b to determine if it is in a hotspot situation, as in 205.

According to the illustrated embodiment, the downstream server may receive requests from upstream servers, as in 220. This workload may be referred to herein as the observed workload of the downstream server. Receiving the requests in 220 may correspond to receiving client requests in 200 of FIG. 2a.

In 225, the downstream server receives indications and/or measures of shielded requests (i.e., shielding report) from the upstream server. As described above, the shielding report may include any information regarding the shielding activity of the upstream server that may help the downstream server determine a shielded workload and thereby estimate an aggregate workload on the system, as in 230. In various embodiments, the shielding report from the upstream server may include a count of requests, an average request rate over a given period, a moving average of request rates, types of requests, etc.

In 230, the downstream server may estimate its aggregate workload level (e.g., observed workload plus shielded workload) in light of the information contained in the shielding report(s) received in 225. That is, even if the downstream server is no longer overloaded (i.e., it can handle its observed workload), the downstream server estimates in 230 what the workload volume would have been if the upstream servers had not shielded the client requests as indicated in the received shielding reports.

Estimating the aggregate workload for a shielding upstream server may be performed in various ways, such as by calculating a moving average of a given workload metric (e.g., requests per second) for each upstream server. In some such embodiments, the moving average may be a decaying moving average, such that data in older shielding reports is weighed less heavily than is data in newer shielding reports received from the same upstream server. In such embodiments, the weighing may conform to various decay functions, such as exponential, linear, step-wise, or others. For example, in an exponentially decaying moving average, the weight of each report included in the moving average decays exponentially over time. In another example, a simple step-wise decay may be applied such that the moving average is calculated based on data that is newer than a given physical age (i.e., time) or logical age (e.g., last N reports). The moving averages from each shielding upstream server may then be combined to calculate a moving average of the entire workload.

In various embodiments, a workload estimate may be recalculated and/or updated in response to receiving a shielding report. In other embodiments, the workload estimate may be recalculated/updated only after a given period of physical or logical time has passed.

According to the illustrated embodiment, once the aggregate workload is estimated, as in 230, the downstream system may determine whether the estimate indicates a hotspot situation, as in 235. For example, if the estimate calculated in 230 indicates that the shielded request rate is above a given threshold, the downstream server may determine that a hotspot situation exists.

As shown in the illustrated embodiment, the downstream server may notify various upstream servers of a hotspot situation at the downstream server, as in 240, or a lack thereof. In response to such notifications, an upstream server may begin or cease to shield requests from the downstream server. In some embodiments, a downstream server may notify an upstream server of a hotspot situation by piggybacking an indication of the overload effect on a response to a request for service data. In some situations, the downstream server may implicitly notify the upstream server that no overload situation exists by omitting such an indication from a response to a request for data.

Figure 3:
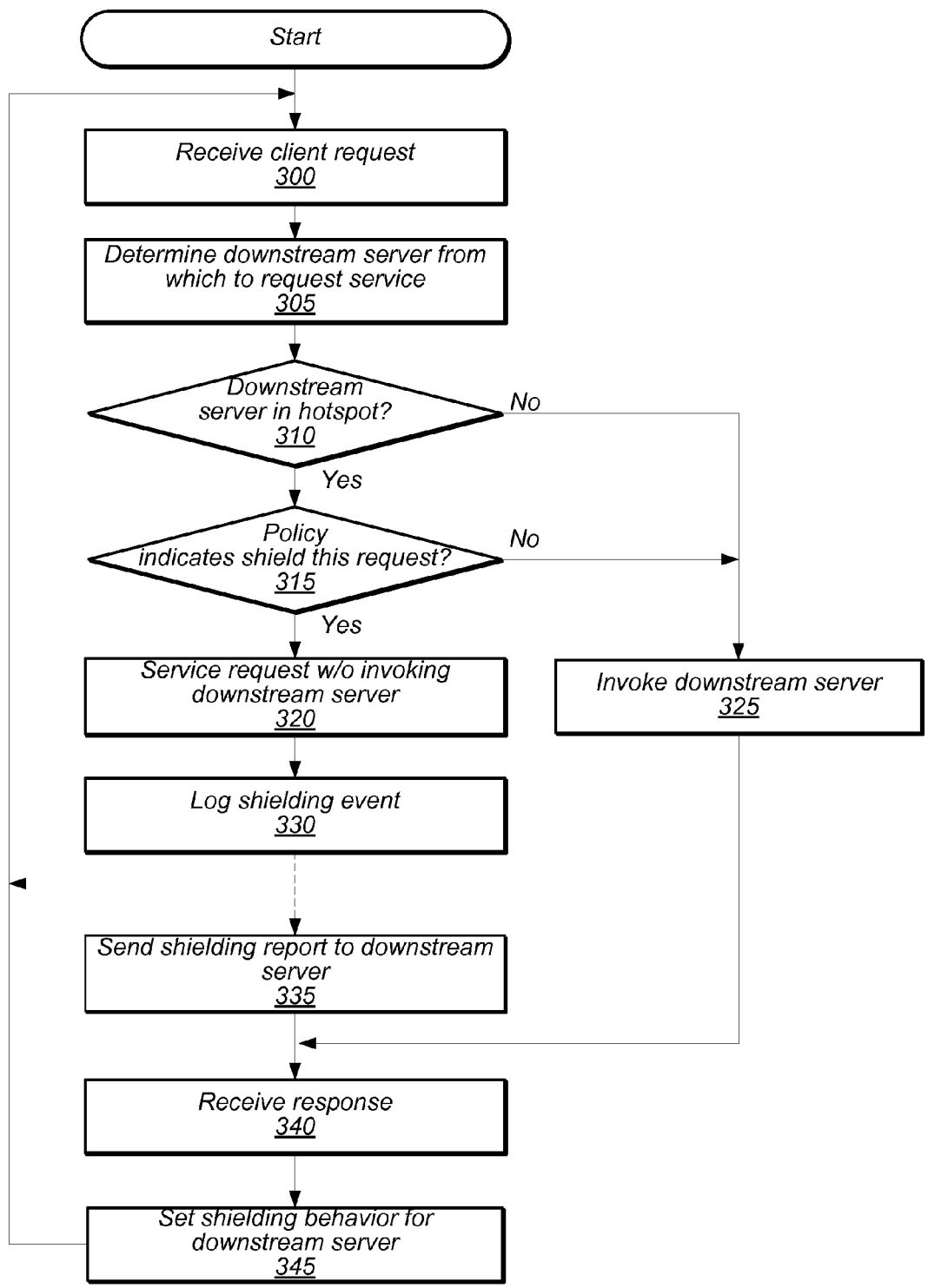
FIG. 3 is a flow diagram illustrating a method for an upstream server implementing request shielding with feedback, according to some embodiments.

FIG. 3 is a flow diagram illustrating a method for an upstream server implementing request shielding with feedback, according to some embodiments. The method of FIG. 3 may be performed by an upstream server, such as one of servers 133 of FIG. 1.

According to the illustrated embodiment, the upstream server may receive a client request for service, as in 300. Such a request may be received from various types of clients, such as web browsers, rich clients, other servers of the distributed application, etc.

As part of servicing the request, the upstream server may require some service from a downstream server (e.g., service data stored authoritatively by the downstream server). In 305, the upstream server may determine a downstream server from which to request this service. For example, if the upstream server is a web server of a distributed storage service and the request indicates a user key, the upstream server may need to query a specific downstream server associated with that key for data locator metadata.

According to the illustrated embodiment, in 310 the upstream server may then determine whether the downstream server is in a hotspot situation. In some embodiments, an upstream server may keep a record (e.g., lookup table) of downstream servers that the upstream server is actively shielding and/or of various hints for performing that shielding (e.g., parameters, request templates, benefit to downstream server hints, etc.). In such embodiments, various downstream servers may be added or removed in response to receiving respective indications from the servers of a hotspot situation or lack thereof. In other embodiments, an upstream server may store an indication of whether it is shielding a given downstream server with other configuration data regarding the downstream server.

If the downstream server is not in a hotspot situation, as indicated by the negative exit from 310, the upstream server may invoke the determined downstream service, as in 325. For example, the upstream server may query the determined downstream server for service data authoritatively stored on the downstream server.

In response to the invocation of 325, the downstream server may respond (e.g., with requested service data), as in 340. In some circumstances, the response of 340 may include an indication of whether or not the downstream server is in a hotspot situation and/or various shielding hints for shielding the downstream server form subsequent requests. In different embodiments, an indication that the downstream server is not in a hotspot situation may be provided explicitly or implicitly, such as by the absence of a hotspot indication. In other embodiments, the downstream server may send separate messages to indicate the hotspot situation or lack thereof.

In response to the indication of whether a hotspot situation exists, the upstream server may set or otherwise update its shielding behavior with regard to the downstream server. For example, the upstream server may insert an entry into a tracking database indicating that the downstream server is in an overload situation. In some embodiments, the upstream server may also record various shielding hints provided by the downstream server in 340.

If the downstream server is in a hotspot situation, as indicated by the affirmative exit from 310, then the upstream server may consult its shielding policy to determine if the upstream server should shield determined downstream server from this request. If the shielding policy indicates that the upstream server should not shield the request, as indicated by the negative exit from 315, then the upstream service invokes the downstream service as before. For example, in some circumstances, the policy may indicate that the upstream server should not shield a request from a downstream server in a hotspot situation if the client is a high priority client, or because service data required to service the request must be fresh.

In contrast, if the policy indicates that the upstream server should shield the downstream server, as indicated by the affirmative exit from 315, the upstream server may service the client request without invoking the downstream service, as in 320. In various embodiments, the upstream server may serve the client using a cached version of required service data (e.g., cached in a local database, an in-memory data structure, and/or miscellaneous files in a local file system), using an alternate downstream service provider, by recalculating a result stored on the downstream server, by dropping the client request, and/or by various other methods that do not invoke the downstream server.

According to the illustrated embodiment, the upstream server may then log the shielding event in a shielding log, as in 330. In some embodiments, the upstream server may calculate and log aggregate metrics pertaining to multiple shielded requests when logging shielding events. Examples of such aggregate metrics may include an average rate of requests shielded by the upstream server from the downstream server, an aggregate shielded request count for the downstream server for a given period of time, etc.

According to the illustrated embodiment, the upstream server may then receive additional client requests, as indicated by the feedback loop from 330 to 300. Occasionally (e.g., at set intervals of time), the upstream server may provide feedback to the downstream server by sending all or part of the shielding log to the downstream server as a shielding report, as in 335. In the some embodiments, the upstream server may be configured to send the shielding report as part of refreshing service data stored in a local cache, though the report may be sent as part of other messages or independently in various embodiments.

In some embodiments, the shielding report sent by the upstream server to the downstream server in 335 may include information that describes requests shielded since a previous report was sent. In some such embodiments, the shielding report may delineate and/or report metrics according to respective portions of the workload that correspond to each of the request-types (e.g., invocation templates, parameter lists, etc.) that the downstream server had previously indicated should be shielded (e.g., in 210). For example, if the downstream server indicates that it is beneficial to shield two different types of requests (e.g., those using parameter A and those using parameter B), then the shielding report may report various shielding metrics broken out at least by these two types of requests.

In some embodiments, the upstream server may receive a response to sending the shielding log, as in 340. As before, the response may include an indication of whether the downstream server is in a hotspot situation and/or various shielding hints. In various embodiments, setting the shielding behavior for the downstream server in 345 may include recording or removing the identity of the downstream server and/or various shielding hints in a lookup table of shielded downstream servers to shield. In other embodiments, the upstream server may record the hotspot/shielding data for each server in local memory and/or with in files along with other configuration information regarding the particular downstream servers. The upstream server may later use this information to determine whether to shield the downstream server from subsequent requests, as in 310 and/or 315. Thus, in 345, the upstream server may set shielding behavior such that subsequent requests to the downstream server are shielded or are no longer shielded, according to any hints received from the downstream server in 340.

While FIG. 3 illustrates one embodiment, variations will become apparent to those skilled in the art. For example, the upstream server may send shielding reports in response to detecting stale service data in the cache or at independent intervals. It is intended that this disclosure cover all such variations.

Figure 4:
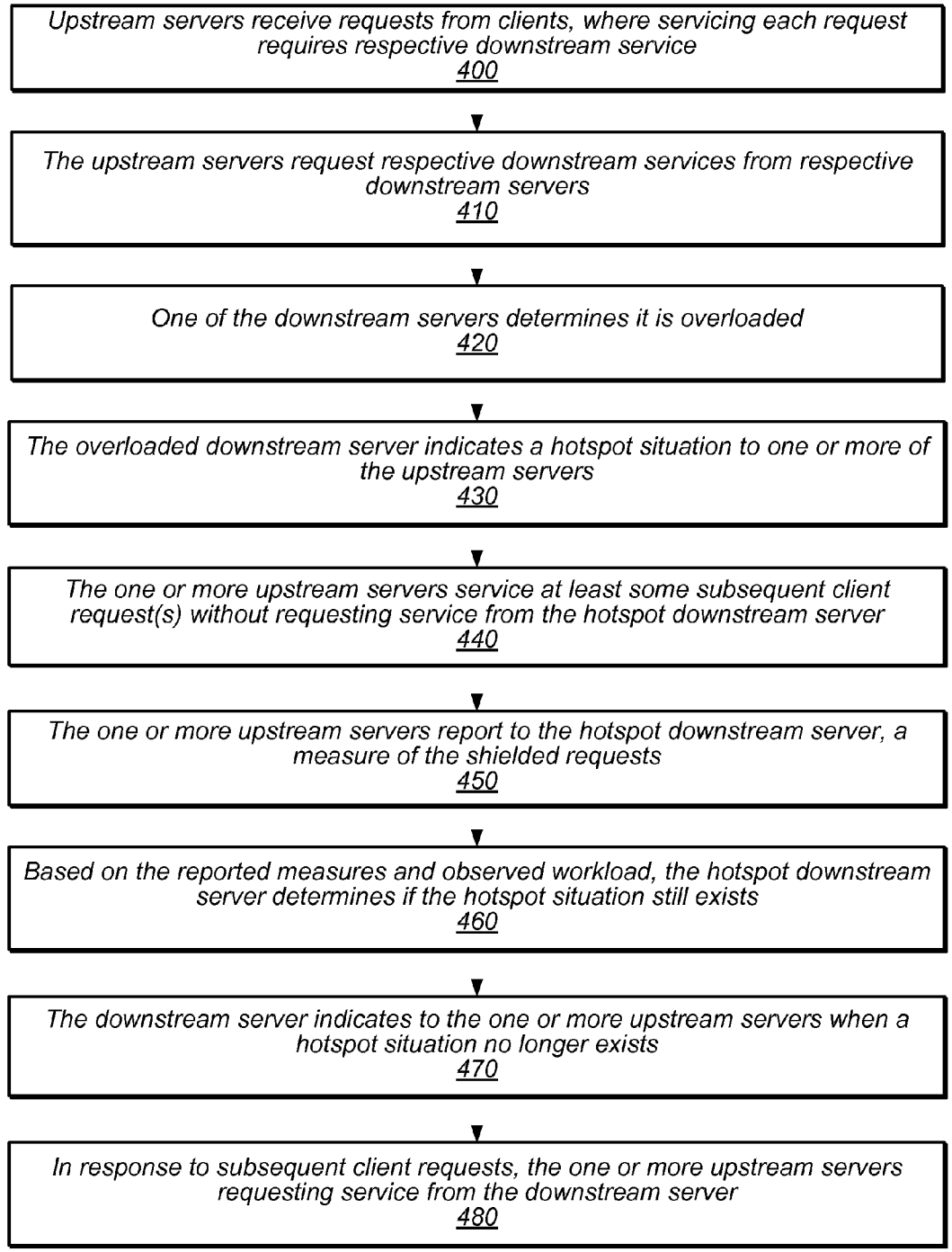
FIG. 4 is a flow diagram illustrating a general workflow for upstream and downstream servers cooperating to implement adaptive request shielding with feedback, according to various embodiments.

FIG. 4 is a flow diagram illustrating a general workflow for upstream and downstream servers cooperating to implement adaptive request shielding with feedback, according to various embodiments.

According to the illustrated embodiment, some number of upstream servers (e.g., in a web tier) receive requests for service from clients (e.g., web browsers), where servicing each request requires respective downstream service (e.g., service data stored authoritatively on a downstream server), as in 400. In a normal mode of operation, the upstream severs invoke downstream servers for this service, as in 410. In some embodiments, particular services may only be provided only by respective ones of the downstream servers, such as those that store particular service data authoritatively (e.g., the most up to date version of the data).

According to the illustrated embodiment, if one of the downstream servers determines that it is overloaded (as in 420), it may indicate that it is in a hotspot situation to one or more of the upstream servers (as in 430). In various embodiments, the downstream server may indicate the hotspot situation to any or all of the upstream servers. In some embodiments, the downstream server may respond to the hotspot situation by first indicating the hotspot situation to one or more lower-priority servers and only indicating the hotspot situation to one or more higher-priority servers if the hotspot situation still exists after the lower-priority servers begin to shield.

In some embodiments, the downstream server may indicate a hotspot situation to each server in response to the server sending a request for service to the downstream server, while in other embodiments, the downstream server may send the hotspot indication independently of any upstream server request. In some embodiments, the hotspot indication may indicate a severity, degree, and/or measure of the hotspot situation and/or other hints, such as a format or type of requests to shield and a benefit metric, indicating the expected benefit to the downstream server of the upstream servers shielding particular types of requests.

In response to having received an indication of this hotspot situation, each of the one or more upstream servers that were notified may begin to shield the downstream server from subsequent requests for service data, as in 440. In various embodiments, each upstream server may implement any respective shielding policy. For example, one shielding policy may be sensitive to the severity of the hotspot situation (e.g., shorter TTL for less severe hotspot situations). Another shielding policy may be sensitive to the content being served and/or application deployed.

In some embodiments, an upstream server may shield the downstream server by noting that the particular downstream server is in a hotspot situation, for example, by caching service data sent from the downstream server and using the cached service data to service subsequent client requests rather than querying the hotspot downstream server for the authoritative version of the service data.

According to the illustrated embodiment, each of the shielding upstream servers log the shielded requests and occasionally report one or more measures of the shielding activity to the downstream server, as in 450. Based at least on these reports, the downstream server may determine if the hotspot situation still exists, as in 460. For example, the downstream server may combine the observed workload and the reported shielded workload to estimate an aggregate workload, such as by calculating a decaying moving average of the workload.

As shown in the illustrated embodiment, the downstream server may then indicate to the one or more shielding upstream servers when a hotspot situation no longer exists (as in 470) and in response, the upstream servers may stop shielding the downstream server from subsequent requests, as in 480. Thus, in response to receiving subsequent client requests, the upstream servers may query the downstream server for the respective service data, as in 480.

Figure 5:
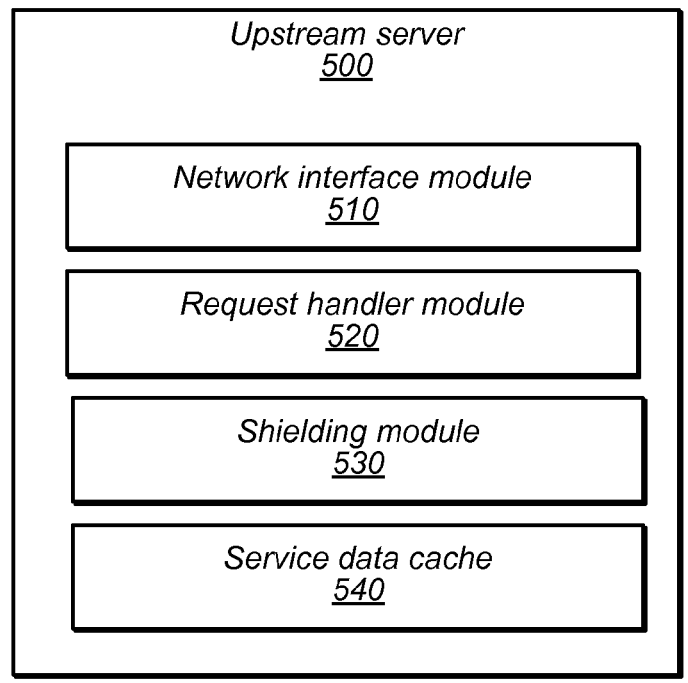
FIG. 5 is a block diagram illustrating various components of an upstream server, configured to implement shielding with feedback according to various embodiments.

FIG. 5 is a block diagram illustrating various components of an upstream server, configured to implement shielding with feedback according to various embodiments. Upstream server 500 of the illustrated embodiment may correspond to ones of upstream servers 122 in FIG. 1.

According to the illustrated embodiment, upstream server 500 may include various modules, which may be hardware, software, or any combination thereof. Upstream server 500 may include a network interface module 510, configured to facilitate communication over a communications network (e.g., IP network, Internet, LAN, WAN, etc.), such as network 105 of FIG. 1. Upstream server 500 may utilize network interface 510 to receive client requests (e.g., web browser requests over the Internet), to send and receive data to downstream servers (e.g., queries to and service data from a downstream layer), and to send responses to client requests.

Upstream server may comprise a request handler module, such as 520, configured to service client requests. For example, request handler module may comprise various web server and/or web application functionality for handling client requests.

In the illustrated embodiment, upstream server 500 further includes shielding module 530, which may be used to implement downstream server shielding and/or to track shielding information. For example, shielding module 530 may include a lookup table for determining which downstream servers are in a hotspot situation and are therefore being shielded by the upstream server. Shielding module may also implement tracking functionality to track shielding events performed by the upstream server to shield the downstream server. This information may be relayed to the downstream server as a shielding report. In some embodiments, shielding module 530 may also implement one or more shielding policies according to which the upstream server may shield various downstream servers in response to different hotspot situation indications.

In the illustrated embodiment of FIG. 5, upstream server 500 also includes a local service data cache 540 for caching service data from overloaded downstream servers, as in step 340 of FIG. 3. In other embodiments, an upstream server may cache service data in locations other than a local cache, such as on another server.

Figure 6:
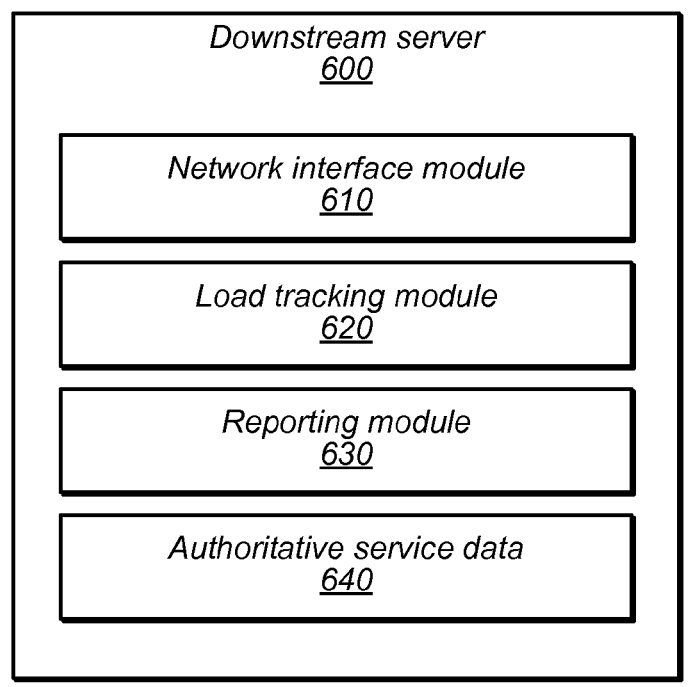
FIG. 6 is a block diagram illustrating the components of a downstream server configured to provide hotspot situation indications dependent on shielding feedback, according to some embodiments.

FIG. 6 is a block diagram illustrating the components of a downstream server configured to provide hotspot situation indications dependent on shielding feedback, according to some embodiments. Downstream server 600 may be analogous to ones of downstream servers 132 in FIG. 1.

According to the illustrated embodiment, downstream server 600 includes network interface module 610, which is configured to facilitate communication over a communications network (e.g., IP network, Internet, LAN, WAN, etc.). Downstream server 600 may utilize network interface 610 to receive and respond to service requests from upstream servers and/or to communicate with other downstream servers if such servers exist.

Downstream server 600 may also include a load tracking module, such as 620. The load tracking module may be configured to determine whether the server is in a hotspot situation. For example, load-tracking module may estimate the overall workload based on the observed workload (i.e., requests arriving at the downstream server) and/or based on shielding reports received from various upstream servers. In different embodiments, the load-tracking module may use various algorithms for estimating the overall workload, as described above. For example, the load-tracking module may calculate an exponentially decaying moving average of the workloads reported by each upstream server (e.g., in shielding reports).

In some embodiments, downstream server 600 may also include a reporting module, such as reporting module 630. Reporting module 630 may be used to send indications of hotspot situations (or lack thereof) to upstream servers. In some embodiments, reporting module 630 may implement various reporting policies. For example, in response to detecting that the workload is within a given interval, the reporting module may implement a first report strategy and in response to detecting that the workload is within a different interval, implement a second reporting strategy. For example, in response to a less severe overload, the downstream server may indicate a hotspot situation to only some upstream servers (e.g., lowest "priority," most heavily loaded, etc.) while in response to a more severe overload, the downstream server may indicate a hotspot situation to more or all upstream servers requesting service. In various embodiments, the reporting module 630 may implement various other shield-requesting policies.

In the illustrated embodiment, downstream server 600 also includes authoritative service data 640. In various embodiments, this service data may be kept in a database, in memory, and/or in persistent storage such as files in a file system. The data may be considered authoritative because it is the most up to date version or otherwise the controlling, master copy of the data.

Figure 7:
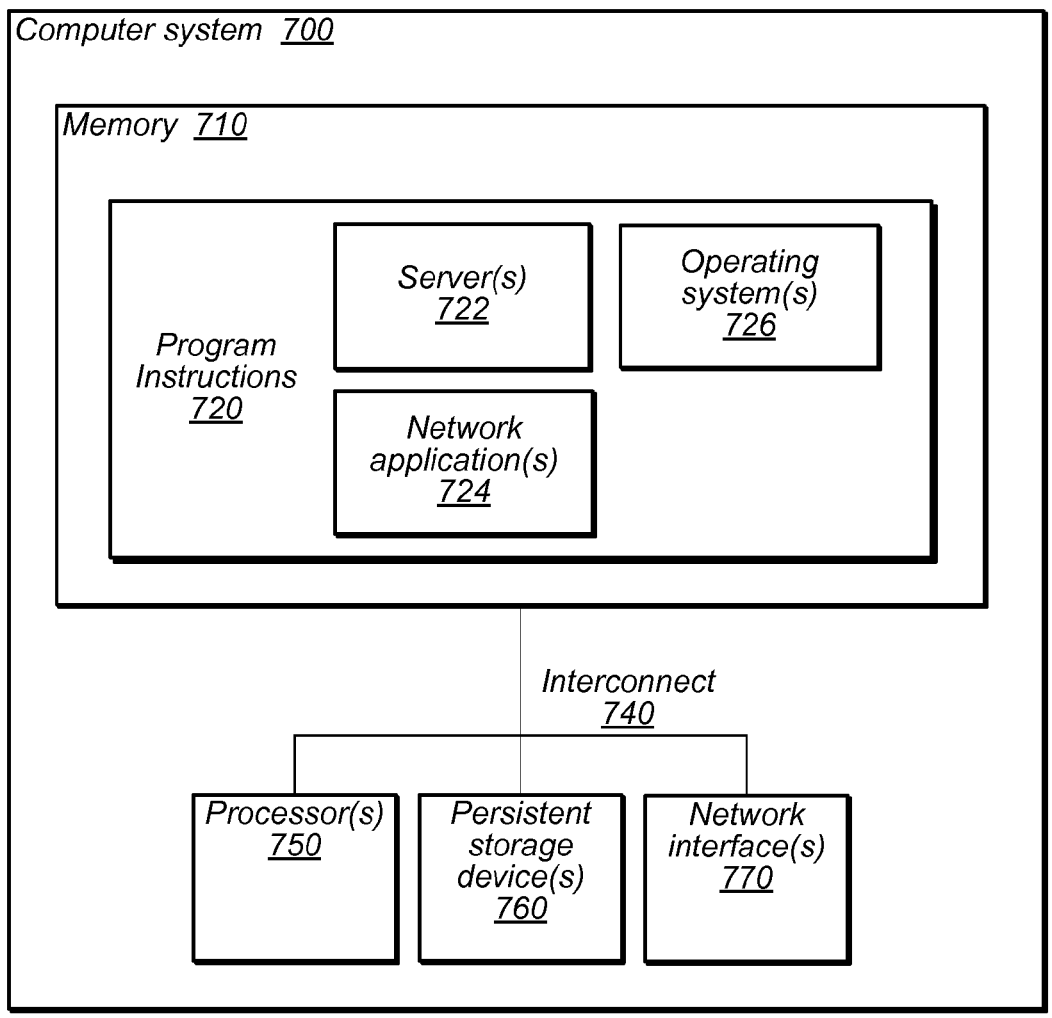
FIG. 7 is a block diagram illustrating a computer system configured to implement an upstream and/or downstream server described herein, according to some embodiments.

FIG. 7 is a block diagram illustrating a computer system configured to implement an upstream and/or downstream server described herein, according to some embodiments. Computer system 700 may be any of various types of devices, including, but not limited to, a personal computer system, desktop computer, laptop or notebook computer, mainframe computer system, handheld computer, workstation, network computer, a consumer device, application server, storage device, telephone, mobile telephone, or in general any type of computing device.

Computer system 700 includes one or more processors 750, each of which may include multiple cores, any of which may be single or multi-threaded. The computer system 700 also includes one or more network communication devices (network interface 770) for communicating with other systems and/or components over a communications network (e.g. Internet, LAN, etc.).

In the illustrated embodiment, computer system 700 also includes one or more persistent storage devices 760, which may be used to store authoritative or cached service data. In various embodiments, persistent storage devices 760 may correspond to disk drives, tape drives, solid state memory, other mass storage devices, or any other persistent storage device.

Computer system 700 also includes one or more memories 710 (e.g., one or more of cache, SRAM, DRAM, RDRAM, EDO RAM, DDR 10 RAM, SDRAM, Rambus RAM, EEPROM, etc.). In various embodiments, computer system 700 may include fewer or additional components not illustrated in FIG. 7 (e.g., displays, video cards, audio cards, peripheral devices, other network interfaces such as an ATM interface, an Ethernet interface, a Frame Relay interface, etc.)

System memory 710 may contain program instructions 720 that are executable by processor(s) 750. In various embodiments, program instructions 720 may be encoded in platform native binary, any interpreted language such as Java™ byte-code, or in any other language such as C/C++, Java™, etc or in any combination thereof.

In the illustrated embodiment, program instructions 720 include program instructions executable to implement one or more servers 722. This software server may implement the functionality of an upstream server and/or of a downstream server, as described herein. For example, in some embodiments, a single server may act as both a shielding upstream server and as a shielded downstream server. In some embodiments, program instructions 720 may implement multiple separate servers.

In some embodiments, program instructions 720 may include instructions executable to implement various network applications 724 (e.g., web applications). In such embodiments, different ones of network applications 724 may be served by one or more of server 722. Program instructions 720 may also include instructions executable to implement one or more operating systems 726, such as Windows™, Solaris™, Linux, etc.

Any or all of program instructions 720, including servers 722 and network applications 724 may be provided as a computer program product, or software, that may include a computer-readable storage medium having stored thereon instructions, which may be used to program a computer system (or other electronic devices) to perform a process according to various embodiments. A computer-readable storage medium may include any mechanism for storing information in a form (e.g., software, processing application) readable by a machine (e.g., a computer). The machine-readable storage medium may include, but is not limited to, magnetic storage medium (e.g., floppy diskette); optical storage medium (e.g., CD-ROM); magneto-optical storage medium; read only memory (ROM); random access memory (RAM); erasable programmable memory (e.g., EPROM and EEPROM); flash memory; electrical, or other types of medium suitable for storing program instructions. In addition, program instructions may be communicated using optical, acoustical or other form of propagated signal (e.g., carrier waves, infrared signals, digital signals, etc.)

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A method comprising:
   one or more computers implementing an upstream server, the upstream server:
   receiving a request from a client for service, wherein the service is dependent on a downstream service provided by a downstream server separate from the upstream server;
   determining that the downstream server should be shielded from a request for the downstream service, wherein said determining is dependent on ascertaining that the downstream server is in a hotspot situation;
   in response to said determining, shielding the downstream server from the request for the downstream service, said shielding comprising:
   servicing the client request without making the request for the downstream service to the downstream server; and
   providing the downstream server with an indication that the upstream server shielded the downstream server from the request for the downstream service.

2. The method of claim 1, wherein said determining that the downstream server should be shielded from the request is further dependent on a shielding policy of the upstream server.

3. The method of claim 2, wherein the shielding policy indicates whether the downstream server should be shielded dependent on an identity of the client.

4. The method of claim 2, wherein the shielding policy indicates whether the downstream server should be shielded dependent on one or more parameters of the request for the downstream service, the one or more parameters having been indicated to the upstream server by the downstream server in response to an earlier request for service sent by the upstream server to the downstream server.

5. The method of claim 1, wherein said servicing the client request without making the request to the downstream server comprises making the request for the downstream service to a different downstream server.

6. The method of claim 1, wherein the service requested by the client is dependent on service data provided authoritatively by the downstream service and wherein said servicing the client request without making the request to the downstream server comprises using a cached version of the service data.

7. The method of claim 6, further comprising, determining that the cached version of the service data will become stale within a given interval and in response:
   requesting a fresh version of the service data from the downstream server;
   in response to said requesting, receiving and caching the fresh version of the service data; and
   shielding the downstream server from a subsequent request, said shielding comprising servicing the subsequent request using the cached fresh version of the service data without requesting the service data from the downstream server in response to receiving the subsequent client request.

8. The method of claim 7, further comprising: subsequent to determining that the cached version of the service data will become stale within the given interval and previous to said receiving the fresh version of the service data, servicing one or more client requests using the cached version of the service data.

9. The method of claim 1, wherein the indication that the upstream server shielded the downstream server from the request is part of a shielding report sent by the upstream server to the downstream server, wherein the shielding report further includes indications that the upstream system shielded the downstream server from a plurality of other requests.

10. The method of claim 9, wherein the shielding report indicates an aggregate workload metric, the aggregate workload metric being usable to determine a rate at which the plurality of client requests were made.

11. A non-transitory computer readable storage medium storing program instructions executable to implement an upstream server configured to:
   receive a request from a client for service, wherein the service is dependent on a downstream service provided by a downstream server separate from the upstream server;
   determine that the downstream server should be shielded from a request for the downstream service, wherein said determining is dependent on ascertaining that the downstream server is in a hotspot situation;

in response to said determining, to shield the downstream server from the request for the downstream service, said shielding comprising:
    servicing the client request without making the request for the downstream service to the downstream server; and
    providing the downstream server with an indication that the upstream server shielded the downstream server from the request for the downstream service.

12. The non-transitory computer-readable storage medium of claim 11, wherein said determining that the downstream server should be shielded from the request is further dependent on a shielding policy of the upstream server.

13. The non-transitory computer-readable storage medium of claim 12, wherein the shielding policy indicates whether the downstream server should be shielded dependent on one or more parameters of the request for the downstream service, the one or more parameters having been indicated to the upstream server by the downstream server in response to an earlier request for service sent by the upstream server to the downstream server.

14. The non-transitory computer-readable storage medium of claim 11, wherein the service requested by the client is dependent on service data provided authoritatively by the downstream service and wherein said servicing the client request without making the request to the downstream server comprises using a cached version of the service data.

15. The non-transitory computer-readable storage medium of claim 14, wherein the upstream server is further configured to determine that the cached version of the service data will become stale within a given interval and in response to:
    request a fresh version of the service data from the downstream server;
    in response to said requesting, receive and caching the fresh version of the service data; and
    shield the downstream server from a subsequent request, said shielding comprising servicing the subsequent request using the cached fresh version of the service data without requesting the service data from the downstream server in response to receiving the subsequent client request.

16. The non-transitory computer-readable storage medium of claim 11, wherein the indication that the upstream server shielded the downstream server from the request is part of a shielding report sent by the upstream server to the downstream server, wherein the shielding report further includes indications that the upstream system shielded the downstream server from a plurality of other requests, wherein the shielding report indicates an aggregate workload metric, the aggregate workload metric being usable to determine a rate at which the plurality of client requests were made.

17. A computer system comprising:
a processor;
memory coupled to the processor, the memory storing program instructions executable by the processor to implement an upstream server configured to:
    receive a request from a client for service, wherein the service is dependent on a downstream service provided by a downstream server separate from the upstream server;
    determine that the downstream server should be shielded from a request for the downstream service, wherein said determining is dependent on ascertaining that the downstream server is in a hotspot situation;
    in response to said determining, to shield the downstream server from the request for the downstream service, said shielding comprising:
        servicing the client request without making the request for the downstream service to the downstream server; and
        providing the downstream server with an indication that the upstream server shielded the downstream server from the request for the downstream service.

18. The system of claim 17, wherein said determining that the downstream server should be shielded from the request is further dependent on a shielding policy of the upstream server.

19. The system of claim 18, wherein the shielding policy indicates whether the downstream server should be shielded dependent on one or more parameters of the request for the downstream service, the one or more parameters having been indicated to the upstream server by the downstream server in response to an earlier request for service sent by the upstream server to the downstream server.

20. The system of claim 17, wherein the service requested by the client is dependent on service data provided authoritatively by the downstream service and wherein said servicing the client request without making the request to the downstream server comprises using a cached version of the service data.

21. The system of claim 20, wherein the upstream server is further configured to determine that the cached version of the service data will become stale within a given interval and in response to:
    request a fresh version of the service data from the downstream server;
    in response to said requesting, receive and caching the fresh version of the service data; and
    shield the downstream server from a subsequent request, said shielding comprising servicing the subsequent request using the cached fresh version of the service data without requesting the service data from the downstream server in response to receiving the subsequent client request.

22. The system of claim 17, wherein the indication that the upstream server shielded the downstream server from the request is part of a shielding report sent by the upstream server to the downstream server, wherein the shielding report further includes indications that the upstream system shielded the downstream server from a plurality of other requests, wherein the shielding report indicates an aggregate workload metric, the aggregate workload metric being usable to determine a rate at which the plurality of client requests were made.

23. A method comprising:
a downstream server implemented by one or more computer systems performing:
    receiving a request from a separate upstream server for service;
    determining that the downstream server is in a hotspot situation;
    in response to said receiving and said determining, sending the upstream server a notification that the downstream server is in a hotspot situation, wherein the notification includes one or more hints usable by the upstream server to determine a benefit to the downstream server of the upstream server shielding the downstream server from a future request for service.

24. The method of claim 23, wherein the one or more hints indicate at least one of: a form of the future request for service, one or more parameters of the future request for service, or a relative measure of the benefit to the downstream server.

25. The method of claim 23, further comprising:
receiving a shielding report from the upstream server, the shielding report indicating that the upstream server shielded the downstream server from a plurality of service requests;
calculating an aggregate workload estimate for the downstream server based at least in part on one or more shielding reports received by the downstream server, the one or more shielding reports including the shielding report;
determining whether the downstream server is in a hotspot situation, said determining being dependent at least in part on the aggregate workload estimate; and
providing an indication to the upstream server of whether the downstream server is in a hotspot situation.

26. The method of claim 25, wherein said calculating the workload estimate comprises calculating a decaying moving average of a rate of requests shielded by a group of one or more upstream servers including the upstream server.

27. A non-transitory computer-readable storage medium comprising program instructions executable by a processor to implement a downstream server configured to:
receive a request from a separate upstream server for service;
determine that the downstream server is in a hotspot situation; and
in response to said receiving and said determining, to send the upstream server a notification that the downstream server is in a hotspot situation, wherein the notification includes one or more hints usable by the upstream server to determine a benefit to the downstream server of the upstream server shielding the downstream server from a future request for service.

28. The non-transitory computer-readable storage medium of claim 27, wherein the one or more hints indicate at least one of: a form of the future request for service, one or more parameters of the future request for service, or a relative measure of the benefit to the downstream server.

29. The non-transitory computer-readable storage medium of claim 27, wherein the downstream server is further configured to:
receive a shielding report from the upstream server, the shielding report indicating that the upstream server shielded the downstream server from a plurality of service requests;
calculate an aggregate workload estimate for the downstream server based at least in part on one or more shielding reports received by the downstream server, the one or more shielding reports including the shielding report;
determine whether the downstream server is in a hotspot situation, said determining being dependent at least in part on the aggregate workload estimate; and
provide an indication to the upstream server of whether the downstream server is in a hotspot situation.

30. The non-transitory computer-readable storage medium of claim 29, wherein said calculating the workload estimate comprises calculating a decaying moving average of a rate of requests shielded by a group of one or more upstream servers including the upstream server.

31. A system comprising:
a processor;
a memory coupled to the processor and storing program instructions executable by the processor to implement a downstream server configured to:
receive a request from a separate upstream server for service;
determine that the downstream server is in a hotspot situation; and
in response to said receiving and said determining, to send the upstream server a notification that the downstream server is in a hotspot situation, wherein the notification includes one or more hints usable by the upstream server to determine a benefit to the downstream server of the upstream server shielding the downstream server from a future request for service.

32. The system of claim 31, wherein the downstream server is further configured to:
receive a shielding report from the upstream server, the shielding report indicating that the upstream server shielded the downstream server from a plurality of service requests;
calculate an aggregate workload estimate for the downstream server based at least in part on one or more shielding reports received by the downstream server, the one or more shielding reports including the shielding report;
determine whether the downstream server is in a hotspot situation, said determining being dependent at least in part on the aggregate workload estimate; and
provide an indication to the upstream server of whether the downstream server is in a hotspot situation.

33. A system comprising
one or more computers implementing a downstream server and one or more separate computer systems implementing one or more upstream servers;
wherein the downstream server is configured to:
determine that the downstream server is overloaded and in response, to indicate to one or more of the upstream servers that the downstream server is in a hotspot situation;
wherein the one or more upstream servers are configured to respond to receiving the indication of the hotspot situation by shielding the downstream server from subsequent requests, said shielding comprises:
serving one or more client requests without requesting service from the downstream server; and
reporting one or more measures of the shielded requests to the downstream server;
wherein the downstream server is further configured to determine whether the hotspot situation still exists, said determining being dependent on one or more of the one or more reported measures.

34. The system of claim 33 wherein the one or more upstream servers correspond to web servers in a web tier of a distributed application.

35. The system of claim 33, wherein the downstream server and the one or more upstream servers correspond to components of a distributed storage service.

36. The system of claim 33, wherein serving the one or more client requests without requesting service from the downstream server comprises serving the one or more client requests using a locally cached version of service data required by the one or more client requests.

* * * * *